United States Patent
Adams et al.

(10) Patent No.: US 11,843,720 B2
(45) Date of Patent: *Dec. 12, 2023

(54) SYSTEM AND METHOD OF RUNNING AN AGENT GUIDE SCRIPT-FLOW IN AN EMPLOYEE DESKTOP WEB CLIENT

(71) Applicant: Verint Systems UK Limited, Weybridge (GB)

(72) Inventors: Conor Adams, Belfast (IE); Raymond Campbell, Belfast (IE)

(73) Assignee: VERINT SYSTEMS UK LTD., Weybridge (GB)

( * ) Notice: Subject to any disclaimer, the term of this patent is extended or adjusted under 35 U.S.C. 154(b) by 6 days.

This patent is subject to a terminal disclaimer.

(21) Appl. No.: 17/666,396

(22) Filed: Feb. 7, 2022

(65) Prior Publication Data
US 2022/0159122 A1    May 19, 2022

Related U.S. Application Data

(63) Continuation of application No. 17/065,229, filed on Oct. 7, 2020, now Pat. No. 11,245,795, which is a
(Continued)

(30) Foreign Application Priority Data

Jun. 30, 2016 (EP) .................................... 16177306

(51) Int. Cl.
*H04M 3/00* (2006.01)
*H04M 5/00* (2006.01)
(Continued)

(52) U.S. Cl.
CPC ...... *H04M 3/5191* (2013.01); *G06F 16/3331* (2019.01); *G06F 16/345* (2019.01);
(Continued)

(58) Field of Classification Search
CPC ... H04M 3/5183; H04M 3/523; H04M 3/5232
(Continued)

(56) References Cited

U.S. PATENT DOCUMENTS 6,012,083 A    1/2000    Savitzky et al.
6,337,858 B1    1/2002    Petty
(Continued)

FOREIGN PATENT DOCUMENTS

WO    03094490 A2    11/2003

OTHER PUBLICATIONS

NAQC Issue Paper, Call Center Metrics: Fundamentals of Call Center Staffing and Technologies, North Consortium, 2010. (Year: 2010).
(Continued)

*Primary Examiner* — Thjuan K Addy
(74) *Attorney, Agent, or Firm* — Christopher M. Scherer; Erin Ella Block; DeWitt LLP

(57) ABSTRACT

In the field of government engagement management, an agent guide or script-flow in an employee desktop web client is implemented. In such a system and method, when agents create interactions with clients they can follow a script-flow which will guide the agent through the interaction through a series of menu selections and automated sets of instructions. This feature of the government engagement management system allows existing customer investment from the rich desktop client or non-web client in developing specific scripts, that can also now function in the web client atmosphere. This system and method also enables an agent to handle calls with the web client more efficiently, and allows agents on the web client to automatically classify.

20 Claims, 5 Drawing Sheets

Related U.S. Application Data continuation of application No. 16/211,773, filed on Dec. 6, 2018, now Pat. No. 10,834,261, which is a continuation-in-part of application No. 15/987,574, filed on May 23, 2018, now Pat. No. 10,187,526, which is a continuation of application No. 15/217,240, filed on Jul. 22, 2016, now Pat. No. 9,986,093.

(51) Int. Cl.
| | | |
|---|---|---|
| *H04M 3/51* | (2006.01) | |
| *G06F 16/33* | (2019.01) | |
| *G06Q 30/016* | (2023.01) | |
| *G06Q 50/26* | (2012.01) | |
| *H04L 7/02* | (2006.01) | |
| *G06F 16/34* | (2019.01) | |

(52) U.S. Cl.
CPC ........... *G06Q 30/016* (2013.01); *G06Q 50/26* (2013.01); *H04L 7/02* (2013.01); *H04M 3/5183* (2013.01); *H04M 2201/42* (2013.01); *H04M 2203/357* (2013.01)

(58) Field of Classification Search
USPC ........... 379/265.09, 265.05, 265.04, 265.11, 379/265.12, 265.01
See application file for complete search history.

(56) References Cited

U.S. PATENT DOCUMENTS

| | | | |
|---|---|---|---|
| 6,338,056 | B1 | 1/2002 | Dessloch |
| 7,593,522 | B2 | 9/2009 | Parker-Stephen |
| 7,720,833 | B1 | 5/2010 | Wen et al. |
| 7,724,890 | B1 | 5/2010 | Conrad et al. |
| 8,146,000 | B1 | 3/2012 | Boliek et al. |
| 8,417,746 | B1 | 4/2013 | Gillett |
| 9,178,994 | B2 | 11/2015 | Tuchman |
| 9,356,574 | B2 | 5/2016 | Denningoff |
| 9,454,761 | B2 | 9/2016 | Tuchman |
| 9,641,680 | B1 | 5/2017 | Wold |
| 9,699,315 | B2 | 7/2017 | Waalkes et al. |
| 9,747,621 | B1 | 8/2017 | Kuruvila |
| 10,521,496 | B1 | 12/2019 | Goodwin et al. |
| 2001/0029483 | A1 | 10/2001 | Schultz |
| 2004/0088300 | A1 | 5/2004 | Avery et al. |
| 2005/0053224 | A1 | 3/2005 | Pennington et al. |
| 2005/0091059 | A1 | 4/2005 | Lecoeuche |
| 2005/0193055 | A1 | 9/2005 | Angel et al. |
| 2006/0100788 | A1 | 5/2006 | Carrino et al. |
| 2006/0221941 | A1 | 10/2006 | Kishinsky et al. |
| 2007/0038499 | A1 | 2/2007 | Margulies |
| 2008/0172598 | A1 | 7/2008 | Jacobsen et al. |
| 2009/0285392 | A1 | 11/2009 | Leitheiser |
| 2009/0293007 | A1 | 11/2009 | Duarte |
| 2011/0208660 | A1 | 8/2011 | Erbey et al. |
| 2011/0211687 | A1 | 9/2011 | Bethea |
| 2011/0264677 | A1 | 10/2011 | Hermitage et al. |
| 2012/0109822 | A1 | 5/2012 | Bouse |
| 2012/0203757 | A1 | 8/2012 | Ravindran |
| 2012/0290614 | A1 | 11/2012 | Nandakumar |
| 2013/0035995 | A1 | 2/2013 | Patterson |
| 2013/0097172 | A1 | 4/2013 | McIntosh |
| 2013/0104088 | A1 | 4/2013 | Santos-Gomez |
| 2013/0117289 | A1 | 5/2013 | Fischer |
| 2013/0230154 | A1 | 9/2013 | Wilson |
| 2014/0119531 | A1 | 5/2014 | Tuchman |
| 2014/0359462 | A1 | 12/2014 | Khalil |
| 2015/0089345 | A1 | 3/2015 | Marimuthu |
| 2015/0095753 | A1 | 4/2015 | Gajera |
| 2015/0195406 | A1 | 7/2015 | Dwyer |
| 2015/0227276 | A1 | 8/2015 | Batti |
| 2015/0317395 | A1 | 11/2015 | Arkin et al. |
| 2015/0363765 | A1 | 12/2015 | Alimi |
| 2015/0379995 | A1 | 12/2015 | Sims |
| 2016/0021179 | A1 | 1/2016 | James et al. |
| 2016/0044497 | A1 | 2/2016 | Soini |
| 2016/0063897 | A1 | 3/2016 | Rusin |
| 2016/0119788 | A1 | 4/2016 | Mandyam |
| 2016/0179906 | A1 | 6/2016 | Roustant |
| 2016/0180257 | A1 | 6/2016 | Rees et al. |
| 2016/0239848 | A1 | 8/2016 | Chang |
| 2016/0267422 | A1 | 9/2016 | Kothadiya |
| 2017/0060856 | A1 | 3/2017 | Turtle |
| 2017/0068976 | A1 | 3/2017 | Wawrzynowicz |
| 2017/0178145 | A1 | 6/2017 | Adrian et al. |
| 2017/0337207 | A1 | 11/2017 | Ravidran |
| 2018/0005158 | A1* | 1/2018 | Campbell ............... H04L 67/02 |
| 2018/0165375 | A1 | 6/2018 | Silkey |
| 2019/0294640 | A1 | 9/2019 | Chuah |

OTHER PUBLICATIONS

Examination Report for EP16177306.4 dated Nov. 16, 2016.
Examination Report for EP16177307.2 dated Nov. 16, 2016.
Office Action for U.S. Appl. No. 15/217,188 dated Mar. 4, 2018.
Notice of Allowance dated Mar. 14, 2018, for U.S. Appl. No. 15/217,240.
Examination Report for EP16177306.4 dated Feb. 22, 2019.
Examination Report for EP16177307.2 dated Feb. 22, 2019.
Examination Report for EP16177308.0 dated Feb. 22, 2019.
Notice of Allowance issued Jun. 12, 2019, in U.S. Appl. No. 16/248,954.

* cited by examiner

SYSTEM AND METHOD OF RUNNING AN AGENT GUIDE SCRIPT-FLOW IN AN EMPLOYEE DESKTOP WEB CLIENT

CROSS-REFERENCE TO RELATED APPLICATIONS

The present application is a continuation of U.S. application Ser. No. 17/065,229, filed Oct. 7, 2020, which application is a continuation of U.S. application Ser. No. 16/211,773, filed Dec. 6, 2018, which application is a continuation-in-part of U.S. application Ser. No. 15/987,574, filed May 23, 2018, which application is a continuation of U.S. application Ser. No. 15/217,240, filed Jul. 22, 2016, which application claims priority of European Patent Application No. 16177306.4, filed Jun. 30, 2016, the contents of which are incorporated herein by reference in their entireties.

BACKGROUND

In exemplary government engagement management systems, web client or web-based interaction and engagement systems are unable to accommodate workflow scripts for many of the tasks associated with assisting clients and completing the workflow records created on behalf of clients. Web client agents are unable to follow a script to guide them through the handling of such interactions.

SUMMARY

In the field of government engagement management, an agent guide or script-flow in an employee desktop web client is implemented. In such a system and method, when agents create interactions with clients they can follow a script-flow which will guide the agent through the interaction through a series of menu selections and automated sets of instructions. This feature of the government engagement management system allows existing customer investment from the rich desktop client or non-web client in developing specific scripts, that can also now function in the web client atmosphere. This system and method also enables an agent to handle calls with the web client more efficiently, and allows agents on the web client to automatically classify.

In one embodiment of the present application, a method of running an agent guide script-flow for an agent in a web client application, the method comprises starting an interaction with a client with the web client application by the agent, displaying the agent guide script-flow to the agent with a graphical user interface, and completing the interaction with the client after the script-flow is completed.

In an additional embodiment of the present application, a non-transitory computer readable medium programmed with computer readable code that upon execution by a computer processor causes the computer processor to start an interaction with a client with the web client application by the agent, display the agent guide script-flow to the agent with a graphical user interface, and complete the interaction with the client after the script-flow is completed.

In an additional embodiment of the present application, a system for running an agent guide script-flow for an agent, the system comprises a client graphical user interface (GUI), wherein the agent starts an interaction with a client with a GUI, a script-flow application comprising a plurality of script flows, wherein a script-flow is used to assist the agent if the interaction is associated with any of the plurality of script-flows, and a processing system communicatively connected to the script-flow application and the GUI, the processing system effectuates the agent logging into the web client application, starting the interaction with the client displaying the agent guide script-flow to the agent with the graphical user interface, and completing the interaction with the client after the script-flow is completed.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In the field of government engagement management systems, agents in web client systems may wish to run specific scripts that allow the agent to be more efficient in handling interactions with a customer more efficiently by improving the operation of the system and computer generally. In such cases, the user logs on to an employee desktop web client as an interaction handling agent and starts an interaction with the user, by clicking on a VOICE IN button or another activation button on an interaction bar, thus allowing a script-flow to launch and display to the agent. The agent will then speak the text shown on the graphical user interface to the client and select the menu based on the response of the client. The agent may then be shown different screens in the content panel based on the nature of the call, and the interaction with the client is ended when the client has no more queries for the agent, and/or when the script-flow is completed.

Figure 5:
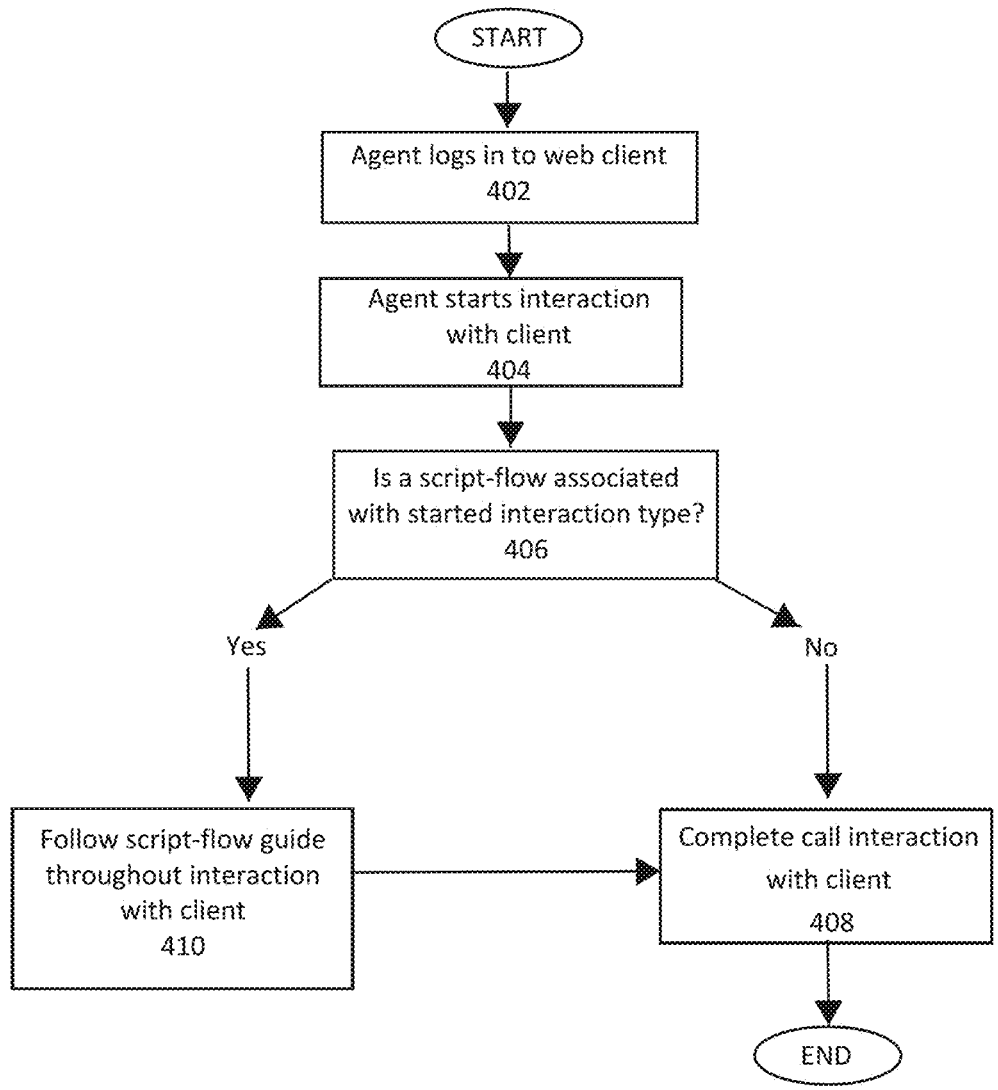
FIG. 5 is a flow chart of an exemplary embodiment of a method of the present application.

FIG. 5 is a flow chart that depicts an exemplary embodiment of a method 400 of agent guide script flow. FIG. 5 illustrates a method 400 of the present application, and in an exemplary embodiment is performed in real-time during an agent/client interaction. Here, an agent logs in to the web client in step 402 and starts an interaction with a client 404. In step 406, the system, if a script-flow is associated with the interaction type being carried out with the client, the agent follows the script-flow guide throughout the interaction 410. The script-flow may be any script flow utilized in the present system for interactions between an agent and a client. In step 408, once the script-flow is completed, the agent then completes the call/interaction with the client before the method ends. If in step 406 the script-flow is not associated with this interaction type with the client, then the agent must complete the call/interaction 408 with the client without the use of a script-flow to guide the agent throughout the interaction, before the method (interaction) ends.

Figure 2:
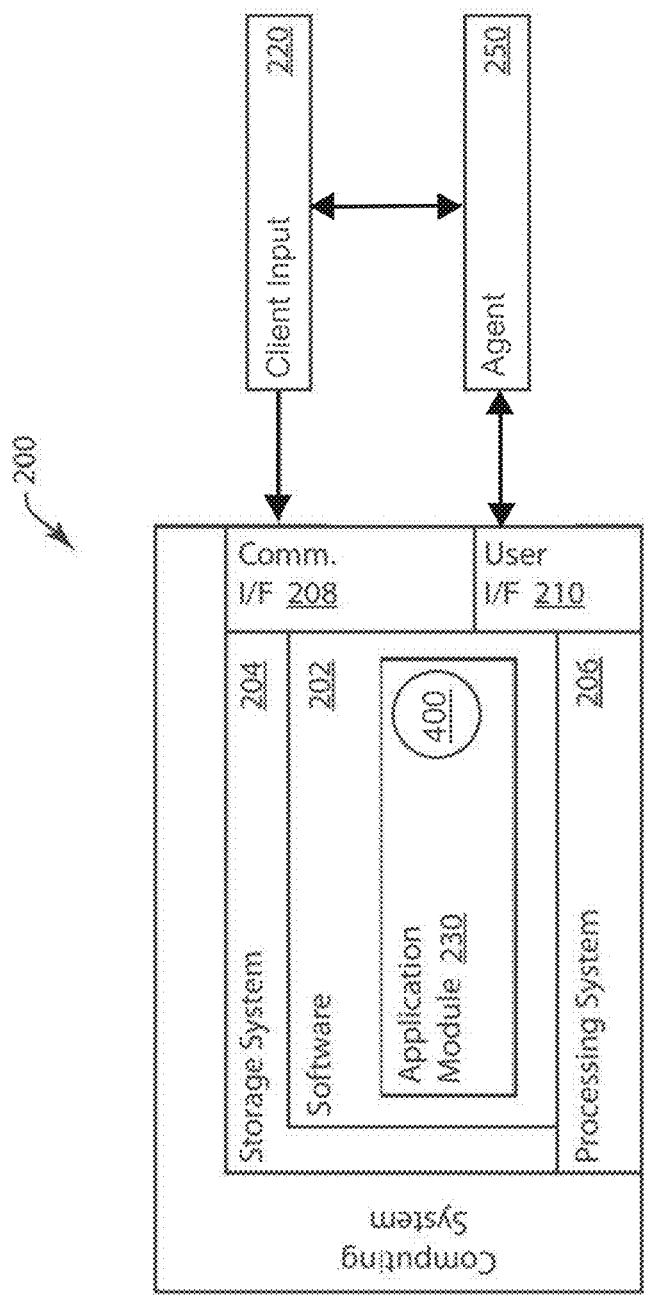
FIG. 2 is a block diagram of an exemplary embodiment of a system of the present application.

FIG. 2 is a system diagram of an exemplary embodiment of a system 200 for script-flow running. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100, as in further embodiments in accordance with the method 400 described herein with respect to FIG. 5.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description. It is also contemplated that these components of the computing system 200 may be operating in a number of physical locations described below in the system 100 of FIG. 1.

The processing system 206 can comprise a microprocessor and other circuitry that retrieves and executes software 202 from storage system 204. Processing system 206 can be implemented within a single processing device but can also be distributed across multiple processing devices or sub-systems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210. An agent 250 communicates with the computing system 200 through the user interface 210 in order to enter client input 220, to manage an interaction, or any number of other tasks the agent 250 may want to complete with the computing system 200 as well be described in greater detail below.

As described in further detail herein, the computing system 200 receives and transmits data through communication interface 208. In embodiments, the communication interface 208 operates to send and/or receive data to/from other devices to which the computing system 200 is communicatively connected, and to received and process client input 220, as will be described in greater detail below. The client input 220 will include details about a request, work order or other set of information that will necessitate an interaction between the client and the agent. Client input 220 may also be made directly to the agent 250, as will be described in further detail below.

Figure 1:
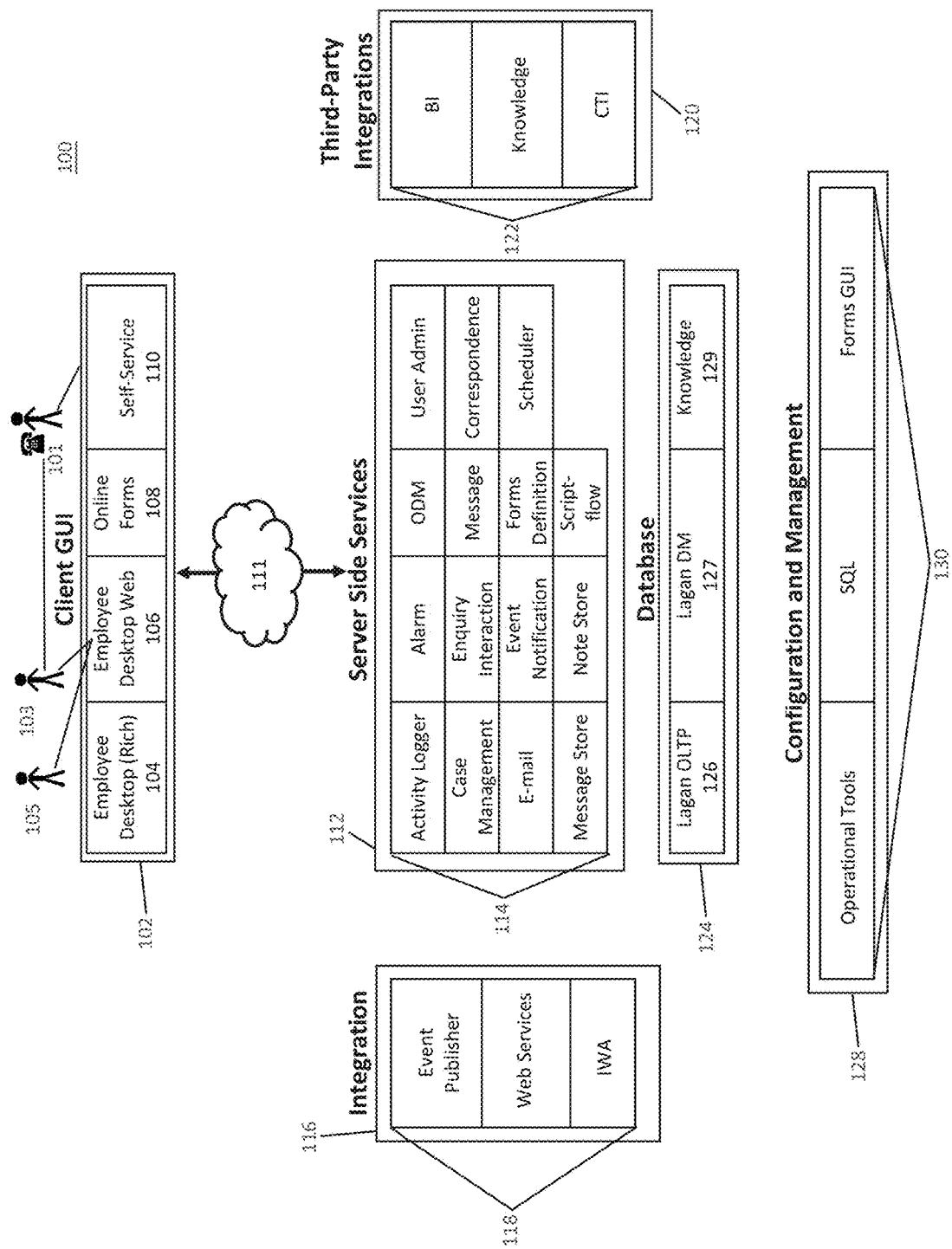
FIG. 1 is a block diagram of an exemplary embodiment of a system of the present application.

FIG. 1 illustrates a block diagram of an engagement management system 100 according to the present application. The client graphical user interface (GUI) 102 includes a number of client applications 104, 106, 108, 110 and serves as the client 101 and agent 103, 105 interface for the system 100. The client GUI 102 may include any of the following applications: first, an employee rich desktop 104, an employee web desktop 106, an online form application 108 and a self-service application 110. The employee rich desktop 104 is not the subject of this application, and its function and operation is associated only with enterprise-type engagement management systems. The client 101 in such a system 100 may contact the client GUI 102 in order to report a problem, issue and/or make a work request, or any other type of interaction that the client 101 may have with the government entity utilizing this system 100. The client 101 may contact the system 100 in a number of ways over a number of mediums, such as but not limited to, e-mail, voicemail, online access, and/or through direct telephone contact. In the case of utilizing a telephone in order to start an interaction, the user 101 may contact a front-end agent 103 directly to report an incident or work request. The front-end agent 103 will then utilize the employee desktop 106 to create an interaction order for the client. This interaction order may be carried out by the front-end agent 103 at the time of the call or at a later time, or by a back-end agent 105 who may only handle the processing of such orders. The client 101 may also call into the client GUI 102 system and leave a voicemail, e-mail the client GUI 102, or log in to a client app (not shown) in the client GUI 102 in order to create an interaction order as well. The client GUI 102 also includes an online form application 108 that allows the agent 103, 105 to save a number of standard and/or commonly used forms for the agent 103, 105 to use, and a self-service application 110 where the client 100 may log in and create an order without interacting with an agent 103, 105.

The client GUI 102 is therefore the point of interface for the client 101 as well as the agent 103, 105 in the system 100, and is in communication with the remainder of the system through a network 111. The network is preferably the internet, or another LAN, but generally the system 100 described here in the present application is directed toward the employee web desktop application 106, that utilizes a client GUI 102 separated by the remainder of the system 100 through the internet.

The server-side services 112 include a number of service applications 114 utilized by the employee web desktop 106. The service applications shown in FIG. 1 are exemplary only, and may be interchanged with other applications and/or some applications may be removed. In this particular application, the script-flow service application 114 will be utilized. The system 100 also includes an integration module 116 that includes a number of integration applications 118 that may be utilized to integrate with other portions of the system 100 that are not shown, as well as a third-party integration module 120 that includes third-party integration applications 122 that may be utilized to integrate with other systems and applications outside of the current system 100. The databases 124 include an online transactional process database (OLTP) 126 that stores all configuration and interaction data, as well as providing a secure and resilient way of holding information and enables data extraction using standard database reporting tools. The databases 124 may be held on a physically separate machine from the server-side services 112 or on the same physical location. The OLTP database 126 stores all of the data needed for interaction case manipulation and/or execution. The data mart (DM) database 127 is a reporting database configured so that reporting does not have to be done from the OLTP database 126. The knowledge database 129 is utilized for the owner of the engagement management system 100 to store its own website or other information. The configuration module 128 includes a number of configuration applications 130 that are utilized to set-up, maintain and configure the system 100.

Figure 3:
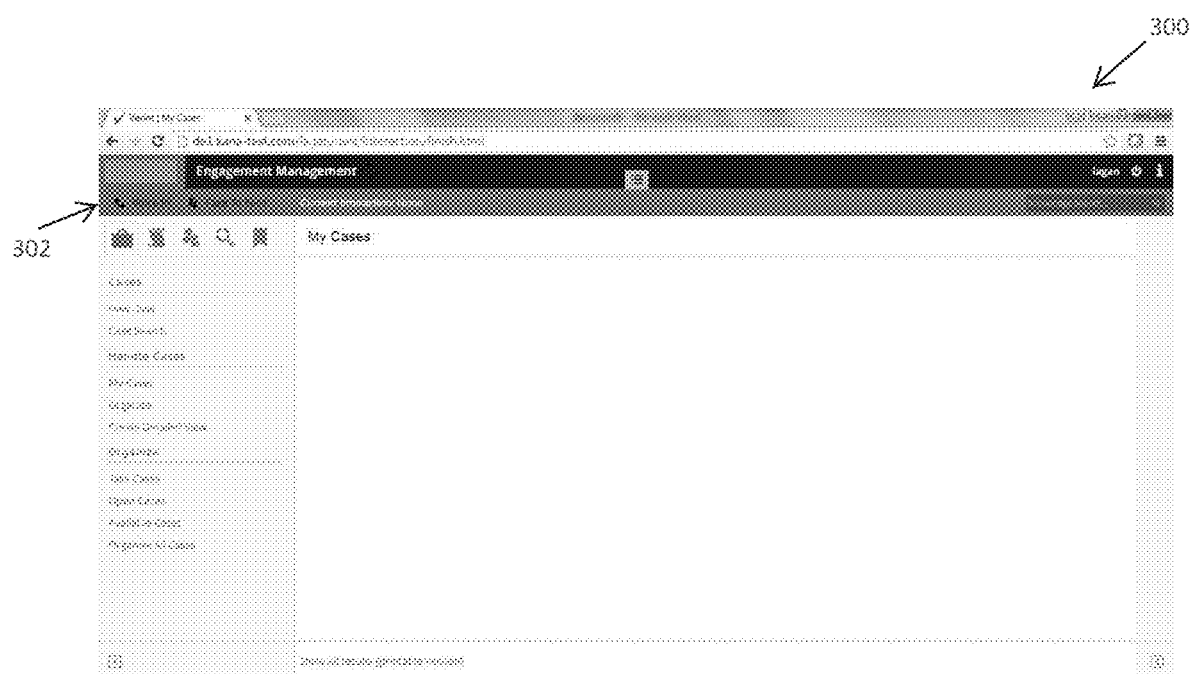
FIG. 3 and FIG. 4 are screen shots illustrating graphical user interfaces exemplary of an embodiment of the system of the present application.
Figure 4:
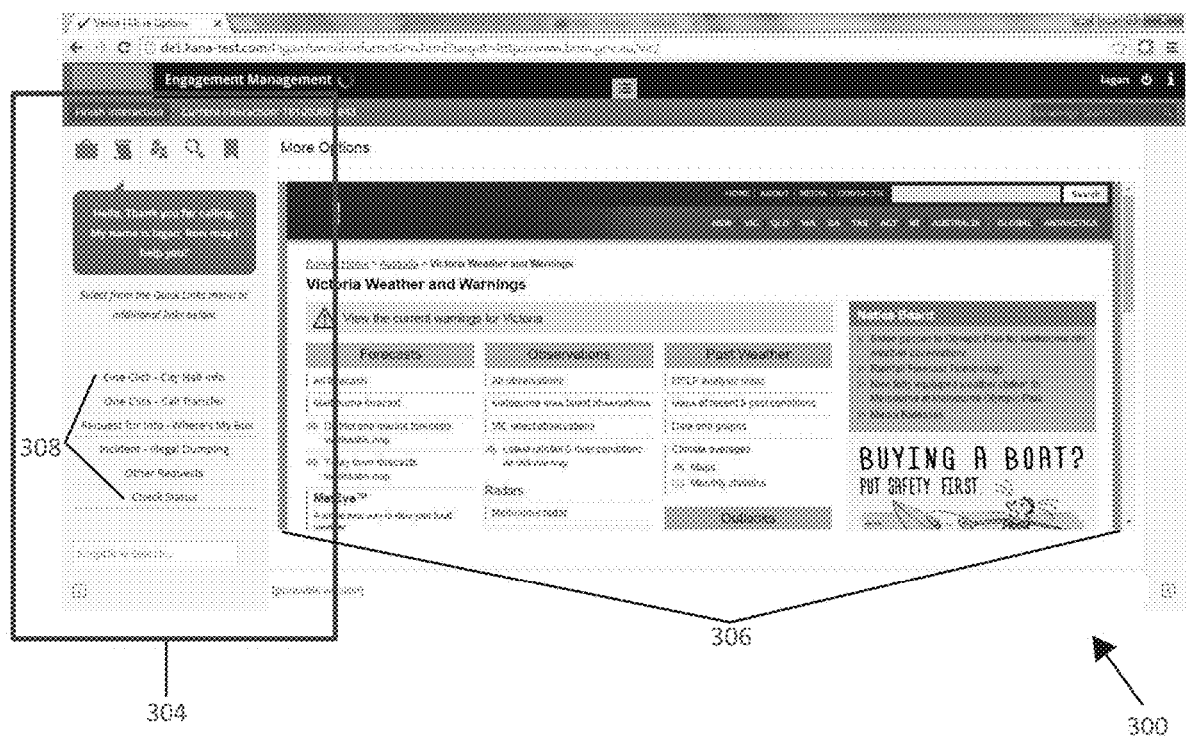

FIG. 3 illustrates a graphical user interface 300 of the system and method of the present application before an interaction has been started by an agent. The agent starts an interaction by clicking the VOICE IN button 302. It should be noted that any new cases created during this interaction with the client are attributed to the interaction. At this time, it is clear in this GUI 300 that no script-flow is currently running, as only a case menu appears on the left. Once an interaction with a client is started, such as a call or a face-to-face conversation, then the script-flow launches in the script-flow portion 304 of the GUI 300, as illustrated in FIG. 4, and it causes a preconfigured page 306 to appear. In this example, it shows the reconfigured page 306 attributed to a local government. The agent then chooses a menu item 308 and is guided through the call with the client.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

The invention claimed is:

1. A method of running an agent guide script-flow for an agent in a web client application, the method comprising:
   receiving a request or other communication from a client through the web client application;
   initiating, by the agent, an interaction with the client through the web client application;
   determining, by a processor, the agent guide script-flow associated with an interaction type for the interaction;
   displaying the determined agent guide script-flow to the agent; and
   completing the interaction with the client after the determined agent guide script-flow is completed.

2. The method of claim 1, further comprising providing an engagement management system, wherein the engagement management system is configured to run agent guide script flows for the agent in the web client application.

3. The method of claim 1, wherein the agent guide script-flow associated with the interaction is determined based on an interaction type for the interaction.

4. The method of claim 1, the method further comprising initializing a graphical user interface in the web client application and utilizing the graphical user interface by the agent to perform the starting and the displaying.

5. The method of claim 1, wherein the agent guide script flow is text the agent will speak to the client.

6. The method of claim 1, wherein the interaction with the client is any one of a live telephone call, face-to-face, or a web chat session with the client.

7. The method of claim 1, further comprising completing the interaction with the client without the agent guide script-flow if no agent guide script-flow is associated with the interaction.

8. A method of running an agent guide script-flow for an agent in a web client application, the method comprising:
   receiving a request or other communication from a client through the web client application;
   initiating, by the agent, an interaction with the client with the web client application;
   determining, by a processor, the agent guide script-flow associated with an interaction type for the interaction;
   displaying the determined agent guide script-flow to the agent;
   searching for relevant knowledge content for the interaction through a third-party integration module, wherein the third-party integration module integrates with other systems and applications outside of a current system in order to search for the relevant knowledge content; and completing the interaction with the client after the determined agent guide script-flow is completed without relevant knowledge content from the searching when no knowledge content form is configured in the relevant knowledge content search results.

9. The method of claim 8, the method further comprising providing an engagement management system, the engagement management system configured to run agent guide script-flows for the agent in the web client application.

10. The method of claim 8, the method further comprising integrating to an external application for an agent in the web client application.

11. The method of claim 8, wherein the other systems and applications outside of the current system are integrated into a graphical user interface for the web client application.

12. The method of claim 8, the method further comprising initializing a graphical user interface in the web client application and using the graphical user interface by the agent in the starting, the searching and the completing.

13. The method of claim 12, wherein the graphical user interface includes a script-flow portion of the graphical user interface, wherein the script-flow portion includes a plurality of menu items that run the agent guide script-flow and assist the agent in the interaction with the client.

14. The method of claim 8, wherein the interaction with the client is any one of a live telephone call, face-to-face, or a web chat session with the client.

15. A system for running an agent guide script-flow for an agent in a web client application, comprising:
    a processor;
    a display; and
    a non-transitory computer readable medium programmed with computer readable code that upon execution by the processor causes the processor to:
    receive a request of other communication from a client through the web client application;
    initiate, by the agent, an interaction with the client through the web client application;
    determine the agent guide script-flow associated with an interaction type for the interaction;
    display the determined agent guide script-flow to the agent; and
    complete the interaction with the client after the determined agent guide script-flow is completed.

16. The system of claim 15, the system further comprising an engagement management system, wherein the engagement management system is configured to run agent guide script-flows for the agent in the web client application, the engagement management system comprising the processor, the display, and the non-transitory computer readable medium.

17. They system of claim 15, wherein the display further comprises a graphical user interface and the processor is further caused to initialize the graphical user interface in the web client application.

18. The system of claim 15, wherein the agent guide script-flow associated with the interaction is determined based on an interaction type for the interaction.

19. The system of claim 15, wherein the agent guide script flow is text the agent will speak to the client.

20. The system of claim 15, wherein the interaction with the client is any one of a live telephone call, face-to-face, or a web chat session with the client.

\* \* \* \* \*